(12) United States Patent
Kobayashi et al.

(10) Patent No.: US 9,318,770 B2
(45) Date of Patent: Apr. 19, 2016

(54) BATTERY AND METHOD OF MANUFACTURING BATTERY

(75) Inventors: Kiwamu Kobayashi, Seto (JP); Hideki Sano, Okazaki (JP); Naoki Wakamatsu, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 269 days.

(21) Appl. No.: 14/237,304

(22) PCT Filed: Aug. 9, 2011

(86) PCT No.: PCT/JP2011/068163
§ 371 (c)(1),
(2), (4) Date: Feb. 5, 2014

(87) PCT Pub. No.: WO2013/021463
PCT Pub. Date: Feb. 14, 2013

(65) Prior Publication Data
US 2014/0178731 A1    Jun. 26, 2014

(51) Int. Cl.
*H01M 2/12* (2006.01)
*H01M 10/04* (2006.01)
*H01M 2/26* (2006.01)
H01M 10/0525 (2010.01)
H01M 2/30 (2006.01)

(52) U.S. Cl.
CPC ............ *H01M 10/0431* (2013.01); *H01M 2/12* (2013.01); *H01M 2/263* (2013.01); *H01M 2/30* (2013.01); *H01M 10/0525* (2013.01); *Y02T 10/7011* (2013.01); *Y10T 29/49108* (2015.01)

(58) Field of Classification Search
CPC .. H01M 2/12; H01M 2/263; Y10T 29/49108; Y10T 10/7011

USPC .............. 429/94, 98, 121, 122, 517; 29/623.1
See application file for complete search history.

(56) References Cited

U.S. PATENT DOCUMENTS

| 2006/0093910 | A1 | 5/2006 | Yoon et al. |
| 2010/0203371 | A1 | 8/2010 | Nagai et al. |
| 2010/0285342 | A1* | 11/2010 | Lee .................. H01M 2/34 429/94 |

FOREIGN PATENT DOCUMENTS

| JP | 2000150306 A | 5/2000 |
| JP | 2005-267945 A | 9/2005 |

(Continued)

*Primary Examiner* — Mark F Huff
*Assistant Examiner* — Monique Wills
(74) *Attorney, Agent, or Firm* — Sughrue Mion, PLLC

(57) ABSTRACT

It is a task of the invention to provide a battery that allows a gas produced inside a flat wound electrode body to be easily discharged to the outside of the electrode body, and restrains an electrolytic solution (a retained electrolytic solution) extruded from the flat wound electrode body through charge/discharge from directly flowing out to the outside of the flat wound electrode body, and a method of manufacturing this battery. The battery is equipped with a flat wound electrode body, a collector member, and a retained electrolytic solution. The flat wound electrode body has an active material layer wound portion that is obtained by winding an electrode plate, has a flat oval cross-section, and has a wound active material layer forming portion, and an exposed wound portion that has a wound foil exposed portion. An exposed wound central portion is detached from at least one of two exposed wound end portions while maintaining contact with an active material layer wound portion that is adjacent to the exposed wound central portion in an axial direction. The collector member is joined to the exposed wound central portion.

4 Claims, 11 Drawing Sheets

(56) References Cited

FOREIGN PATENT DOCUMENTS

| JP | 2006-128132 A | 5/2006 |
|----|---------------|--------|
| JP | 2007-265846 A | 10/2007 |
| JP | 2009-026705 A | 2/2009 |
| JP | 2010176989 A | 8/2010 |

* cited by examiner

F I G . 6A
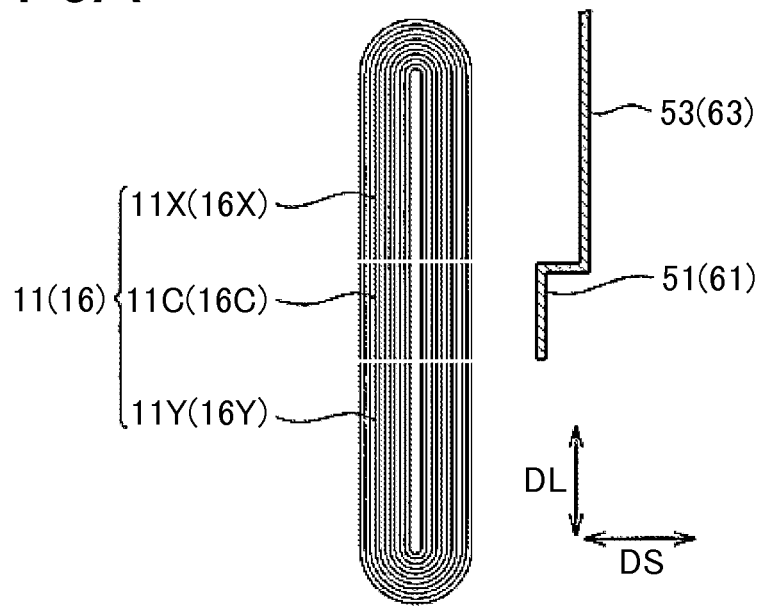
F I G . 6B
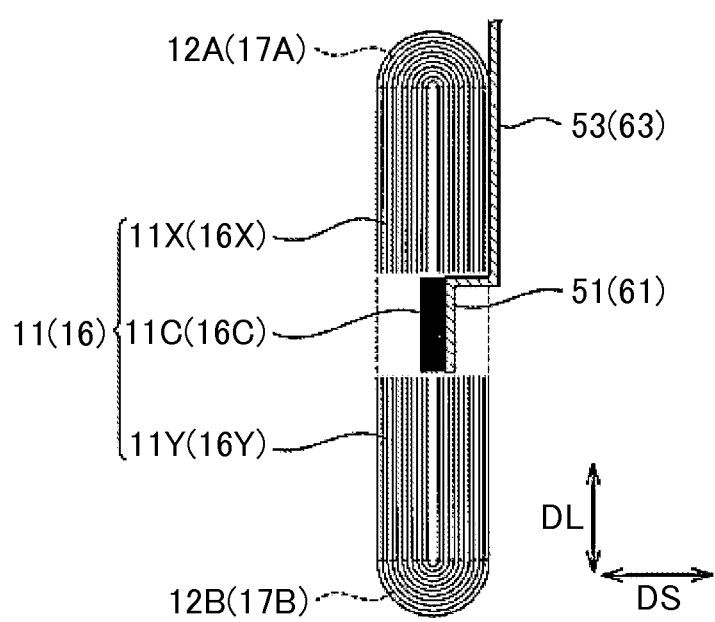

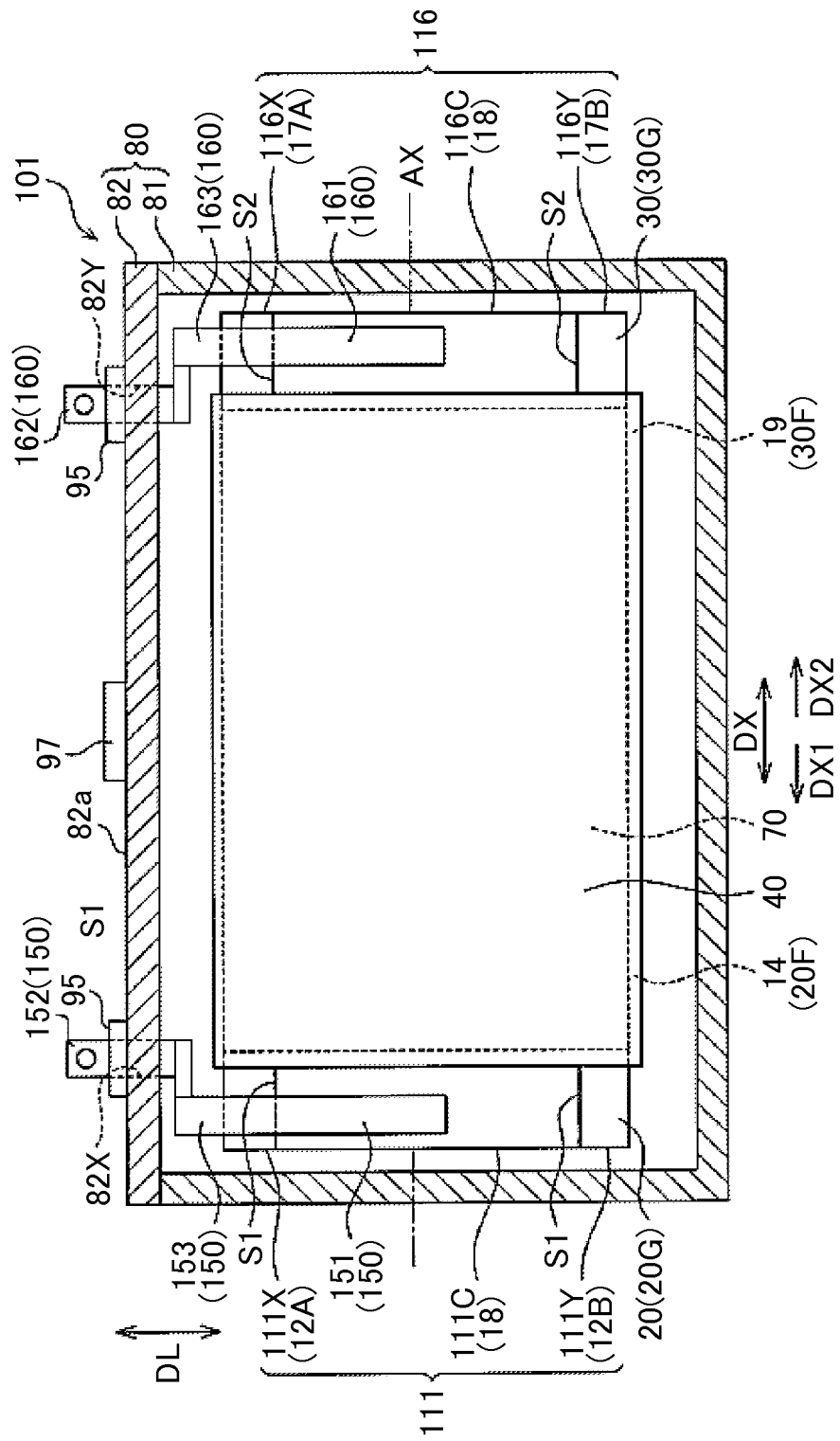

BATTERY AND METHOD OF MANUFACTURING BATTERY

TECHNICAL FIELD

The invention relates to a battery that is equipped with a flat wound electrode body that is obtained by winding an electrode plate around a winding axis and has a flat oval cross-section, and a method of manufacturing this battery.

BACKGROUND ART

In recent years, chargeable/dischargeable lithium-ion secondary batteries (hereinafter referred to simply as batteries as well) have been utilized as driving power supplies for vehicles such as hybrid vehicles, electric vehicles and the like, and portable electronic components such as notebook computers, video camcorders and the like. As such a battery, for example, there is a battery in which a collector body (corresponding to an electrode plate that will be described later) is wound around a winding axis, and a flat plate terminal (corresponding to a collector member that will be described later) is joined to a collector foil laminated region (corresponding to an exposed wound portion that will be described later) of the collector body (the electrode plate) that constitutes an electrode body (corresponding to a flat wound electrode body that will be described later) having a flat oval cross-section (e.g., a battery described in Patent Document 1).

On the other hand, in Patent Document 2, there is disclosed a battery that is designed such that a width (a dimension) W1 of a flat oval cross-section in a major axis direction is larger than a width (a dimension) W2 of plain portions of a positive electrode and a negative electrode (corresponding to electrode plates that will be described later), which constitute a group of electrodes (corresponding to a flat wound electrode body that will be described later) having the flat oval cross-section (W1>W2), in the group of the electrodes (the flat wound electrode body). Specifically, there is described a battery in which in an exposed wound portion that is obtained by winding foil exposed portions of the electrode plates, regions of the exposed wound portion that are located at both ends of the cross-section of the group of the electrodes (the flat wound electrode body) in the major axis direction respectively are lacking, and a region of the exposed wound portion that is located at a center in the major axis direction (corresponding to an exposed wound central portion that will be described later) remains (e.g., FIGS. 2b and 2c described in Patent Document 2).

RELATED ART DOCUMENTS

Patent Documents

Patent Document 1: Japanese Patent Application Publication No. 2009-26705 (JP-2009-26705 A)
Patent Document 2: Japanese Patent Application Publication No. 2006-128132 (JP-2006-128132 A)

SUMMARY OF THE INVENTION

Problem to be Solved by the Invention

However, in the battery described in Patent Document 1, the foil exposed portions constituting the exposed wound portion huddle at a joint spot of the collector member and the exposed wound portion (e.g., a thin-walled portion 33 depicted in FIG. 4 of Patent Document 1). Besides, the exposed wound portion is formed by winding a series of the foil exposed portions around a winding axis. Therefore, there is established a mode in which the gap between radially adjacent regions of the foil exposed portions narrows as the distance to the aforementioned joint spot decreases. Thus, in the case where a gas is produced between active material layers that constitute the electrode plates in the flat wound electrode body due to, for example, a battery reaction such as initial charge or the like, the gas is unlikely to be discharged from between the active material layers to the outside of the flat wound electrode body.

In contrast, the battery described in Patent Document 2 is designed such that the ends of the active material layers directly communicate with the outside of the flat wound electrode body in the region of the flat wound electrode body that lacks part of the exposed wound portion. Thus, even though the collector member is joined to the exposed wound central portion, the gas produced between the active material layers can be reliably discharged from between the active material layers to the outside of the flat wound electrode body, through the region.

By the way, when a battery is charged/discharged, the active material layers expand/contract. Therefore, part of an electrolytic solution retained between the active material layers (a retained electrolytic solution) may be extruded from between the active material layers to the exposed wound portion (i.e., the gap formed by the foil exposed portions) and further to the outside of the flat wound electrode body. As for this electrolytic solution; the electrolytic solution extruded to the exposed wound portion (the gap between the foil exposed portions) can return again to the gap between the active material layers through a separator. However, the electrolytic solution extruded to the outside of the flat wound electrode body is likely to be accumulated on a bottom of a battery case that is spaced apart from the flat wound electrode body, and is unlikely to return to the gap between the active material layers in the flat wound electrode body.

On the other hand, in the battery described in Patent Document 2, the flat wound electrode body lacks part of the exposed wound portion as described above. Thus, part of the electrolytic solution (the retained electrolytic solution) extruded from between the active material layers directly flows out to the outside of the flat wound electrode body during charge/discharge.

The invention has been made in view of this problem. It is an object of the invention to provide a battery that allows a gas produced inside a flat wound electrode body to be easily discharged to the outside of the electrode body, and restrains an electrolytic solution (a retained electrolytic solution) extruded from the flat wound electrode body through charge/discharge from directly flowing out to the outside of the flat wound electrode body, and a method of manufacturing this battery.

Means for Solving the Problem

One aspect of the invention is a battery. The battery is equipped with a flat wound electrode body, a collector member, and a retained electrolytic solution. The flat wound electrode body is obtained by winding an electrode plate around a winding axis. The electrode plate includes a band-shaped active material layer forming portion that is obtained by forming an active material layer on a band-shaped metal foil along a first end edge as one of two end edges extending in a longitudinal direction of the metal foil, and a band-shaped foil exposed portion that has the metal foil exposed along a second end edge as the other of the two end edges of the metal foil. The flat wound electrode body has a flat oval cross-section. The flat wound electrode body has an active material layer wound portion that is obtained by winding the active material layer forming portion, and an exposed wound portion that is located on one side in an axial direction along the winding axis with respect to the active material layer wound portion and has the foil exposed portion wound. The collector member is made of a metal, and is joined to the exposed wound portion of the flat wound electrode body. The retained electrolytic solution is retained by the active material layer wound portion of the flat wound electrode body. When regions of the exposed wound portion that are located at both end portions of the oval cross-section in a major axis direction respectively and are obtained by bending back the foil exposed portion into a shape of R are defined as R-shaped exposed wound portions, regions of the exposed wound portion that include the R-shaped exposed wound portions are defined as exposed wound end portions, and a region of the exposed wound portion that is located in a central region in the major axis direction and is sandwiched between the exposed wound end portions is defined as an exposed wound central portion, the exposed wound central portion is detached from at least one of the two exposed wound end portions, while maintaining contact with the active material layer wound portion that is adjacent to the exposed wound central portion in the axial direction. The collector member is joined to the exposed wound central portion.

In the aforementioned battery, the exposed wound central portion is detached from at least one of the two exposed wound end portions, and the collector member is joined to the exposed wound central portion. Thus, even though the collector member is joined to the exposed wound central portion, the exposed wound end portion located on the side detached from the exposed wound central portion is restrained from being deformed. Consequently, at this exposed wound end portion located on the detached side, a gap can be secured between the foil exposed portions that constitute this exposed wound end portion. Accordingly, a gas produced between the active material layers can be easily discharged to the outside of the flat wound electrode body through this exposed wound end portion.

Besides, as opposed to the foregoing Patent Document 2, in addition to the exposed wound central portion, the aforementioned battery has the two exposed wound end portions. Therefore, the retained electrolytic solution extruded from between the active material layers can be temporarily retained between the foil exposed portions of the exposed wound end portions, during charge/discharge. Consequently; the battery that restrains the retained electrolytic solution extruded from the flat wound electrode body through charge/discharge from directly flowing out to the outside of the flat wound electrode body can be realized.

Incidentally, as the mode of the exposed wound portion, it is possible to mention a mode in which the exposed wound central portion is detached from both the exposed wound end portions, as well as a mode in which the exposed wound central portion is detached from one of the two exposed wound end portions. Among these modes, if the mode in which the exposed wound central portion is detached from both the exposed wound end portions is adopted, both the exposed wound end portions can be prevented from being deformed as a result of the joining of the collector member and the exposed wound central portion with each other, in comparison with a case where the mode in which the exposed wound central portion is detached from one of the exposed wound end portions is adopted. This is more preferable because a gap can be secured between the foil exposed portions at both the exposed wound end portions.

Besides, as the mode in which the exposed wound central portion and each of the exposed wound end portions are detached from each other, for example, it is possible to mention a mode in which the exposed wound central portion and each of the exposed wound end portions are detached from each other by slits that extend in the shape of waves such as sinusoidal waves or the like, as well as by slits designed to rectilinearly extend in the axial direction along the winding axis. Incidentally, even in the case where the exposed wound central portion and each of the exposed wound end portions are detached from each other by the rectilinearly extending slits, it is possible to mention a mode in which they are detached from each other by slits that extend parallel to the axial direction, or slits that gradually approach the exposed wound end portions or on the contrary, gradually move away from the exposed wound end portions respectively in accordance with the traveling from the exposed wound portion toward the active material layer wound portion in the axial direction.

Besides, as the battery that is equipped with the retained electrolytic solution, it is possible to mention, for example, a pattern in which most of the electrolytic solution present in the battery is the retained electrolytic solution while the rest exists in a small amount outside the flat wound electrode body in such a state as not to mutually flow through the retained electrolytic solution, as well as a pattern in which the entire electrolytic solution present in the battery is retained in the active material layer wound portion as the retained electrolytic solution.

Furthermore, the aforementioned battery may be designed as a battery in which the exposed wound central portion is detached from both the exposed wound end portions.

In the aforementioned battery, the exposed wound central portion is detached from both the exposed wound end portions. Therefore, both the exposed wound end portions can be prevented from being deformed as a result of the joining of the collector member and the exposed wound central portion with each other, and a gap can be secured between the foil exposed portions that constitute the exposed wound end portions respectively. Accordingly, the battery that reliably allows the gas produced between the active material layers to be discharged to the outside of the flat wound electrode body through the two exposed wound end portions can be realized.

Furthermore, any one of the aforementioned batteries may be designed as a battery in which the exposed wound central portion is constituted of a region of the exposed wound portion other than the two R-shaped exposed wound portions.

In the aforementioned battery, the region of the exposed wound portion other than the R-shaped exposed wound portions is defined as the exposed wound central portion. That is, the exposed wound central portion is secured with a longest dimension in the major axis direction. Thus, the battery in which the exposed wound central portion and the active material layer wound portion are connected to each other with a lowest resistance can be realized.

Another aspect of the invention is a method of manufacturing a battery. The battery is equipped with a flat wound electrode body, a collector member, and a retained electrolytic solution. The flat wound electrode body is obtained by winding an electrode plate around a winding axis. The electrode plate includes a band-shaped active material layer forming portion that is obtained by forming an active material layer on a band-shaped metal foil along a first end edge as one of two end edges extending in a longitudinal direction of the metal foil, and a band-shaped foil exposed portion that has the metal foil exposed along a second end edge as the other of the two end edges of the metal foil. The flat wound electrode body has a flat oval cross-section. The flat wound electrode body has an active material layer wound portion that is obtained by winding the active material layer forming portion, and an exposed wound portion that is located on one side in an axial direction along the winding axis with respect to the active material layer wound portion and has the foil exposed portion wound. The collector member is made of a metal, and is joined to the exposed wound portion of the flat wound electrode body. The retained electrolytic solution is retained by the active material layer wound portion of the flat wound electrode body. When regions of the exposed wound portion that are located at both end portions of the oval cross-section in a major axis direction respectively and are obtained by bending back the foil exposed portion into a shape of R are defined as R-shaped exposed wound portions, regions of the exposed wound portion that include the R-shaped exposed wound portions are defined as exposed wound end portion portions, and a region of the exposed wound portion that is located in a central region in the major axis direction and is sandwiched between the exposed wound end portion portions is defined as an exposed wound central portion, the exposed wound central portion is detached from at least one of the two exposed wound end portions, while maintaining contact with the active material layer wound portion that is adjacent to the exposed wound central portion in the axial direction. The collector member is joined to the exposed wound central portion. The method includes a joint process of joining the collector member to the exposed wound central portion as to the flat wound electrode body in which the exposed wound central portion of the exposed wound portion and at least one of the two exposed wound end portions of the exposed wound portion are detached from each other.

The aforementioned method of manufacturing the battery is equipped with the joint process of joining the collector member to part of the exposed wound portion, namely, the exposed wound central portion of the flat wound electrode body that has already been detached from the exposed wound end portions. Thus, by joining the collector member, a stress is unlikely to be applied to the exposed wound end portions that are detached from the exposed wound central portion even when this exposed wound central portion is deformed. Therefore, the battery can be manufactured with the gap between the foil exposed portions, which constitute the exposed wound end portions, restrained from narrowing.

BRIEF DESCRIPTION OF THE DRAWINGS

FIG. 6 is an illustrative view of a joint process of the method of manufacturing the battery according to the embodiment of the invention, the first modified embodiment of the invention, and the second modified embodiment of the invention.

FIG. 8 is a cross-sectional view (the A-A cross-section of FIG. 1) of the battery according to the second modified embodiment of the invention.

Figure 1:
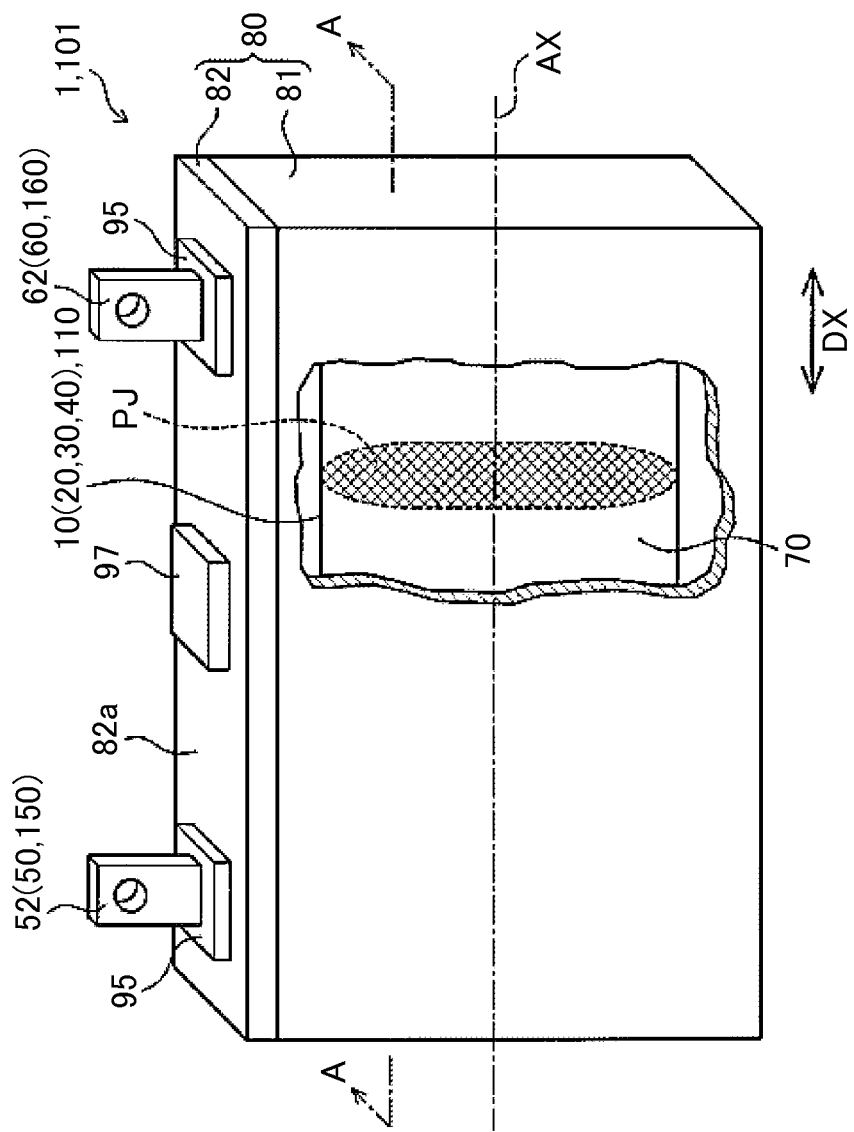
FIG. 1 is a perspective view of a battery according to an embodiment of the invention, a first modified embodiment of the invention, and a second modified embodiment of the invention.

DESCRIPTION OF REFERENCE SYMBOLS 1, 101, 201, 301, 401, 501, 601, 701 BATTERY
10, 110, 210, 310, 410, 510, 610, 710 ELECTRODE BODY (FLAT WOUND ELECTRODE BODY)
11, 111, 211, 311, 411, 511, 611, 711 POSITIVE ELECTRODE EXPOSED WOUND PORTION (EXPOSED WOUND PORTION)
11C, 111C, 211C, 311C, 411C, 511C, 611C, 711C POSITIVE ELECTRODE EXPOSED WOUND CENTRAL PORTION (EXPOSED WOUND CENTRAL PORTION)
11X, 111X, 211X, 311X, 411X, 511X, 611X, 711X FIRST POSITIVE ELECTRODE EXPOSED WOUND END PORTION (EXPOSED WOUND END PORTION)
11Y, 111Y, 211Y, 311Y, 411Y, 511Y, 611Y, 711Y SECOND POSITIVE ELECTRODE EXPOSED WOUND END PORTION (EXPOSED WOUND END PORTION)
12A FIRST POSITIVE ELECTRODE R-SHAPED EXPOSED WOUND PORTION (R-SHAPED EXPOSED WOUND PORTION)
12B SECOND POSITIVE ELECTRODE R-SHAPED EXPOSED WOUND PORTION (R-SHAPED EXPOSED WOUND PORTION)
13 POSITIVE ELECTRODE FLAT PLATE-LIKE EXPOSED WOUND PORTION (REGION OF EXPOSED WOUND PORTION OTHER THAN TWO R-SHAPED EXPOSED WOUND PORTIONS)
14 POSITIVE ELECTRODE ACTIVE MATERIAL LAYER WOUND PORTION (ACTIVE MATERIAL LAYER WOUND PORTION)
16, 116, 216, 316 NEGATIVE ELECTRODE EXPOSED WOUND PORTION (EXPOSED WOUND PORTION)
16C, 116C, 216C, 316C NEGATIVE ELECTRODE EXPOSED WOUND CENTRAL PORTION (EXPOSED WOUND CENTRAL PORTION)
16X, 116X, 216X, 316X FIRST NEGATIVE ELECTRODE EXPOSED WOUND END PORTION (EXPOSED WOUND END PORTION)
16Y, 116Y, 216Y, 316Y SECOND NEGATIVE ELECTRODE EXPOSED WOUND END PORTION (EXPOSED WOUND END PORTION)

17A FIRST NEGATIVE ELECTRODE R-SHAPED EXPOSED WOUND PORTION (R-SHAPED EXPOSED WOUND PORTION)
17B SECOND NEGATIVE ELECTRODE R-SHAPED EXPOSED WOUND PORTION (R-SHAPED EXPOSED WOUND PORTION)
18 NEGATIVE ELECTRODE FLAT PLATE-LIKE EXPOSED WOUND PORTION (REGION OF EXPOSED WOUND PORTION OTHER THAN TWO R-SHAPED EXPOSED WOUND PORTIONS)
19 NEGATIVE ELECTRODE ACTIVE MATERIAL LAYER WOUND PORTION (ACTIVE MATERIAL LAYER WOUND PORTION)
20 POSITIVE ELECTRODE PLATE (ELECTRODE PLATE)
20F POSITIVE ELECTRODE ACTIVE MATERIAL LAYER FORMING PORTION (ACTIVE MATERIAL LAYER FORMING PORTION)
20G POSITIVE ELECTRODE FOIL EXPOSED PORTION (FOIL EXPOSED PORTION)
21 POSITIVE ELECTRODE ACTIVE MATERIAL LAYER (ACTIVE MATERIAL LAYER)
28 POSITIVE ELECTRODE FOIL (METAL FOIL)
28S FIRST POSITIVE ELECTRODE END EDGE (FIRST END EDGE)
28T SECOND POSITIVE ELECTRODE END EDGE (SECOND END EDGE)
30 NEGATIVE ELECTRODE PLATE (ELECTRODE PLATE)
30F NEGATIVE ELECTRODE ACTIVE MATERIAL LAYER FORMING PORTION (ACTIVE MATERIAL LAYER FORMING PORTION)
30G NEGATIVE ELECTRODE FOIL EXPOSED PORTION (FOIL EXPOSED PORTION)
31 NEGATIVE ELECTRODE ACTIVE MATERIAL LAYER (ACTIVE MATERIAL LAYER)
38 NEGATIVE ELECTRODE FOIL (METAL FOIL)
38S FIRST NEGATIVE ELECTRODE END EDGE (FIRST END EDGE)
38T SECOND NEGATIVE ELECTRODE END EDGE (SECOND END EDGE)
50, 150 POSITIVE ELECTRODE COLLECTOR MEMBER (COLLECTOR MEMBER)
60, 160 NEGATIVE ELECTRODE COLLECTOR MEMBER (COLLECTOR MEMBER)
70 RETAINED ELECTROLYTIC SOLUTION
AX WINDING AXIS
DA LONGITUDINAL DIRECTION
DL MAJOR AXIS DIRECTION
DX AXIAL DIRECTION
DX1 ONE SIDE
DX2 THE OTHER SIDE (ONE SIDE IN (AXIAL DIRECTION))
PJ CROSS-SECTION
S1, S2, S3, S4 SLIT

MODES FOR CARRYING OUT THE INVENTION

Embodiment

Next, a battery according to an embodiment of the invention will be described with reference to the drawings. First of all, a battery 1 according to the embodiment of the invention will be described with reference to FIGS. 1 to 3. This battery 1 has a positive electrode plate 20, a negative electrode plate 30, and separators 40, which are all band-shaped, and is equipped with a flat-shaped electrode body 10 that is obtained by interposing the separators 40 between this positive electrode plate 20 and this negative electrode plate 30 and winding them around a winding axis AX (see FIGS. 1 and 2). Besides, the battery 1 is equipped with a positive electrode collector member 50 that is joined to the positive electrode plate 20 of this electrode body 10, a negative electrode collector member 60 that is joined to the negative electrode plate 30, and a retained electrolytic solution 70 that is retained in the electrode body 10 (a positive electrode active material layer wound portion 14 and a negative electrode active material layer wound portion 19, which will be described later) (see FIGS. 1 and 2). In addition to these components, the battery 1 is equipped with a battery case 80 that accommodates the electrode body 10 and the retained electrolytic solution 70 therein.

Among these components, the battery case 80 has a battery case body 81 and a sealing lid 82, which are both made of aluminum. Among these components, the battery case body 81 assumes the shape of a bottomed rectangular box. An insulating film (not shown) that is made of resin and bent in the shape of a box is interposed between this battery case body 81 and the electrode body 10.

Besides, the sealing lid 82 assumes the shape of a rectangular plate, closes an opening of the battery case body 81, and is welded to this battery case body 81. This sealing lid 82 has a first through-hole 82X for causing the positive electrode collector member 50 to penetrate the battery case 80 from the inside thereof to the outside thereof, and a second through-hole 82Y for causing the negative electrode collector member 60 to penetrate the battery case 80 from the inside thereof to the outside thereof (see FIG. 2). Incidentally, insulating members 95 that are made of an insulating resin are interposed between the first through-hole 82X and the positive electrode collector member 50 to insulate them from each other, and between the second through-hole 82Y and the negative electrode collector member 60 to insulate them from each other, respectively. Besides, a safety valve 97 that assumes the shape of a rectangular plate is sealed to a lid surface 82a of the sealing lid 82 at a position between the first through-hole 82X and the second through-hole 82Y.

Figure 2:
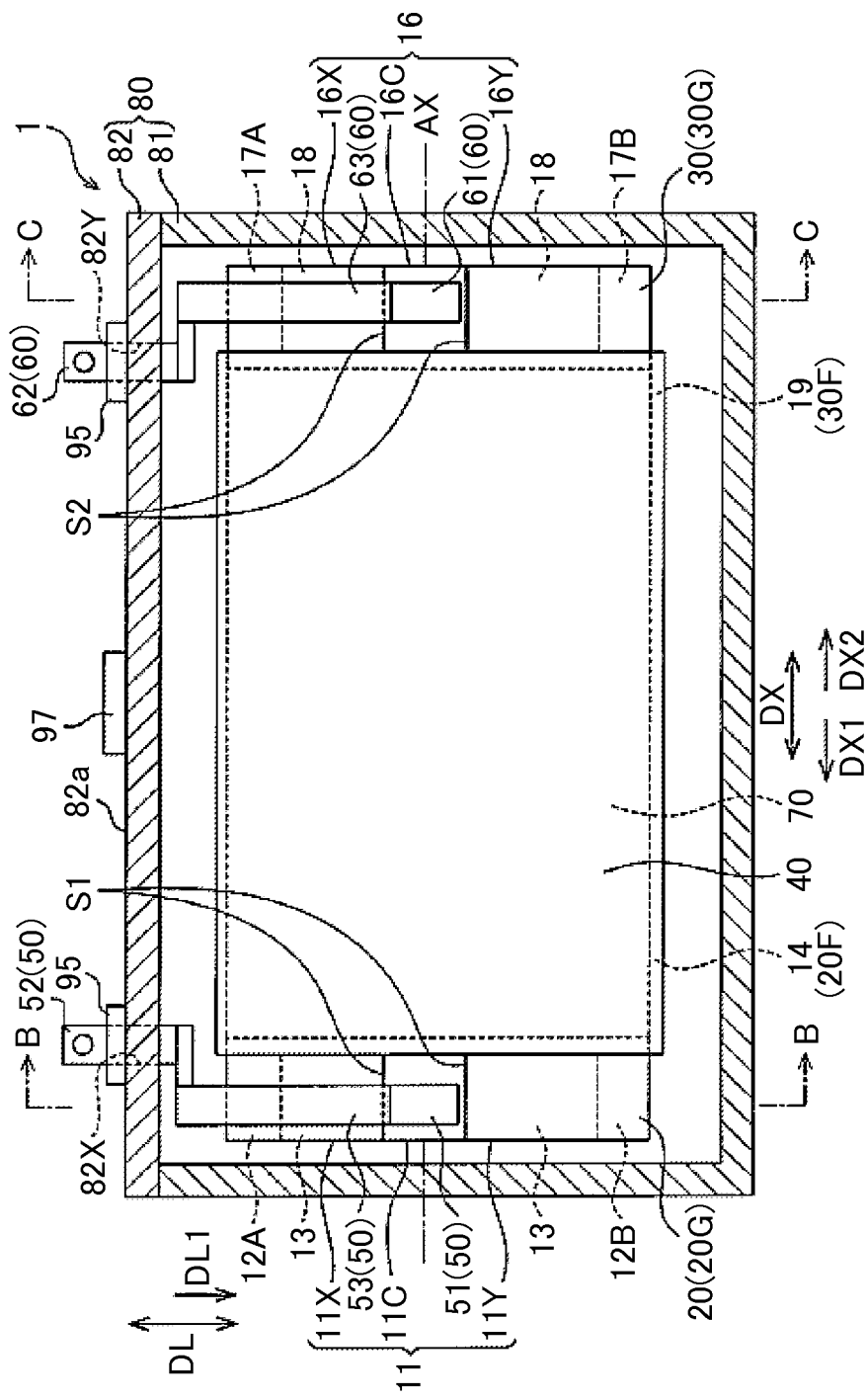
FIG. 2 is a cross-sectional view (an A-A cross-section of FIG. 1) of the battery according to the embodiment of the invention and the first modified embodiment of the invention.
Figure 3:
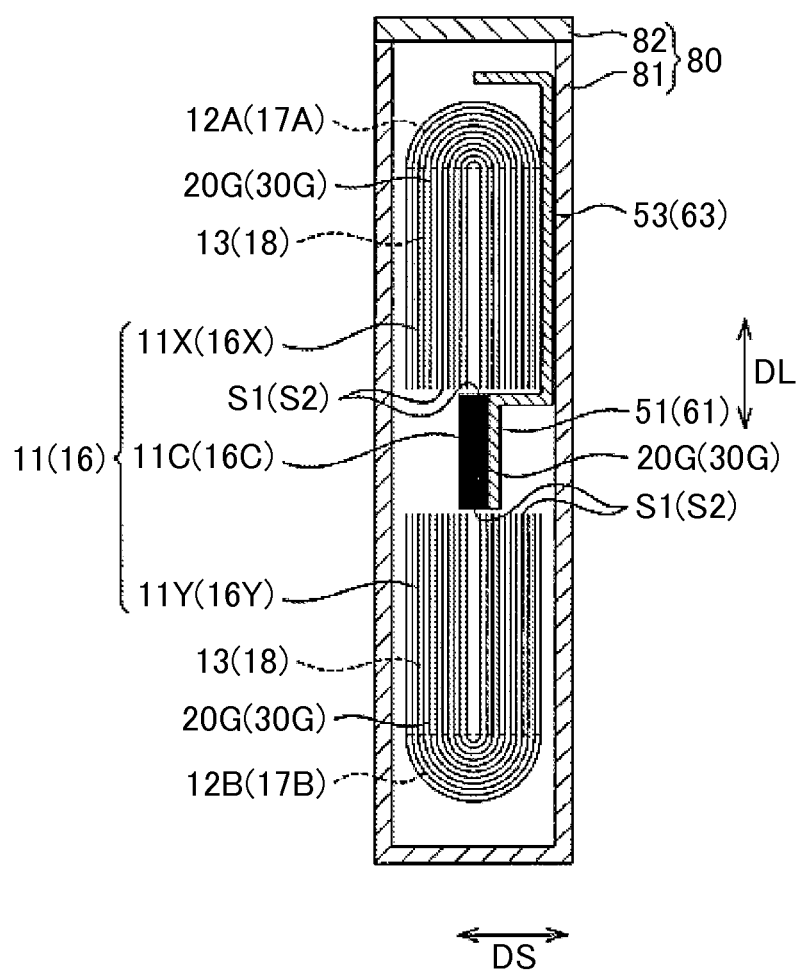
FIG. 3 is a cross-sectional view (a B-B end face and a C-C end face of FIG. 2) of the battery according to the embodiment of the invention and the first modified embodiment of the invention.

Besides, the positive electrode collector member 50 made of aluminum assumes the shape of a crank (see FIGS. 1 to 3). This positive electrode collector member 50 is constituted of a positive electrode joint portion 51 that is located on a proximal end side (the electrode body 10 side) and is joined to the positive electrode plate 20 (a positive electrode exposed wound central portion 11C that will be described later), a positive electrode terminal portion 52 that is located on a distal end side (outside the battery case 80) and constitutes an external terminal of the battery 1 on the positive electrode side, and a body portion 53 that is located between this positive electrode joint portion 51 and this positive electrode terminal portion 52 (see FIG. 2).

Among these components, as shown in FIG. 3, the positive electrode joint portion 51 is designed to extend from the body portion 53 in a thickness direction while being flexed in the shape of a crank, and approach a center side of the electrode body 10 closer than the body portion 53. In addition, the positive electrode joint portion 51 joins regions of a positive electrode foil exposed portion 20G that constitute the positive electrode exposed wound central portion 11C (which will be described later) to this positive electrode wound central portion 11C, with the regions gathered in a minor axis direction DS of an oval shape assumed by a cross-section PJ (which will be described later) of the electrode body 10 (see FIG. 3). Thus, the positive electrode exposed wound central portion 11C (the respective regions of the positive electrode foil exposed portion 20G that constitute this positive electrode exposed wound central portion) is deformed to be crushed in the minor axis direction DS (see FIG. 3).

Besides, as is the case with the positive electrode collector member 50, the negative electrode collector member 60 that is made of copper assumes the shape of a crank (see FIGS. 1 to 3). This negative electrode collector member 60 is constituted of a negative electrode joint portion 61 that is located on the proximal end side (the electrode body 10) and joined to the negative electrode plate 30 (a negative electrode exposed wound central portion 16C that will be described later), a negative electrode terminal portion 62 that is located on the distal end side (outside the battery case 80) and constitutes an external terminal of the battery 1 on the negative electrode side, and a body portion 63 that is located between this negative electrode joint portion 61 and this negative electrode terminal portion 62 (see FIG. 2).

Among these components, as shown in FIG. 3, the negative electrode joint portion 61 is designed to extend from the body portion 63 in the thickness direction while being flexed in the shape of a crank, and approach the center side of the electrode body 10 closer than the body portion 63. In addition, the negative electrode joint portion 61 joins regions of a negative electrode foil exposed portion 30G that constitute the negative electrode exposed wound central portion 16C (which will be described later) to this negative electrode exposed wound central portion 16C, with the regions gathered in the minor axis direction DS (see FIG. 3). Thus, the negative electrode exposed wound central portion 16C (the respective regions of the negative electrode foil exposed portion 30G that constitute this negative electrode exposed wound central portion) is deformed to be crushed in the minor axis direction DS (see FIG. 3).

Besides, the retained electrolytic solution 70 is obtained by adding a solute ($LiPF_6$) to a mixed organic solvent of ethylene carbonate (EC) and ethyl methyl carbonate (EMC). Incidentally, in the battery 1 according to this embodiment of the invention, the entire electrolytic solution present in the battery 1 is retained, as the retained electrolytic solution 70, by the positive electrode active material layer wound portion 14 and the negative electrode active material layer wound portion 19, which will be described later, and the subsequently described separators 40 that are arranged therebetween.

Besides, as shown in FIG. 1, the electrode body 10 is a flat wound electrode body that is obtained by winding the positive electrode plate 20, the negative electrode plate 30, and the separators 40 around the winding axis AX in a flat shape. Incidentally, the cross-section PJ (a hatched region of FIG. 1) that is obtained by cutting this electrode body 10 perpendicularly to the winding axis AX assumes a flat, oval shape (see FIG. 1). In this electrode body 10, the porous separators 40, which are made of polyethylene, separate the positive electrode plate 20 and the negative electrode plate 30 from each other while having itself impregnated with the retained electrolytic solution 70/retaining the retained electrolytic solution 70 therein.

Figure 4:
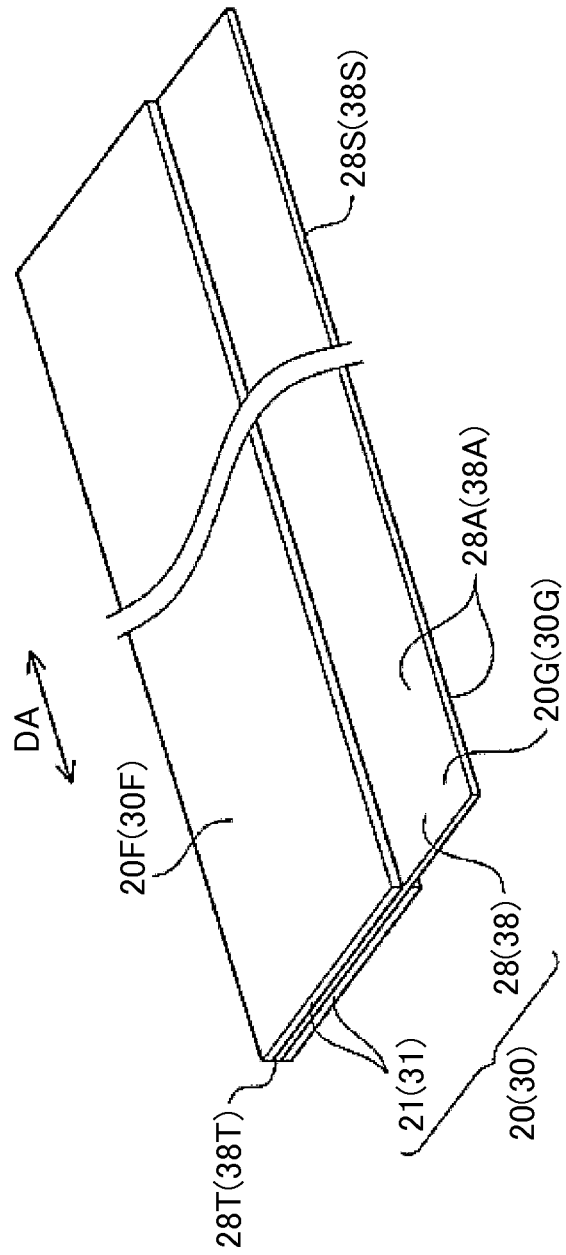
FIG. 4 is a perspective view of a positive electrode plate (a negative electrode plate) of the embodiment of the invention, the first modified embodiment of the invention, and the second modified embodiment of the invention.

Besides, as shown in the perspective view of FIG. 4, the positive electrode plate 20 assumes the shape of a band that extends in a longitudinal direction DA, and has a positive electrode foil 28 that is made of aluminum, and two positive electrode active material layers 21 and 21 that are arranged in a band shape on both main faces 28A and 28A of this positive electrode foil 28 respectively. Among these components, the positive electrode foil 28 has two end edges (a first positive electrode end edge 28S and a second positive electrode end edge 28T) that extend in the longitudinal direction DA (see FIG. 4). In addition, the positive electrode plate 20 has a band-shaped positive electrode active material layer forming portion 20F that is obtained by forming the positive electrode active material layer 21 on the positive electrode foil 28 along the first positive electrode end edge 28S of the positive electrode foil 28, and a band-shaped positive electrode foil exposed portion 20G that has the positive electrode foil 28 exposed along the second positive electrode end edge 28T of the positive electrode foil 28 (see FIG. 4).

Besides, as shown in the perspective view of FIG. 4, the negative electrode plate 30 assumes the shape of a band that extends in the longitudinal direction DA, and has a negative electrode foil 38 that is made of copper, and two negative electrode active material layers 31 and 31 that are arranged in a band shape on both main faces 38A and 38A of this negative electrode foil 38 respectively. Among these components, as is the case with the positive electrode foil 28, the negative electrode foil 38 has two end edges (a first negative electrode end edge 38S and a second negative electrode end edge 38T) that extend in the longitudinal direction DA (see FIG. 4). In addition, as is the case with the positive electrode plate 20, the negative electrode plate 30 has a band-shaped negative electrode active material layer forming portion 30F that is obtained by forming the negative electrode active material layer 31 on the negative electrode foil 38 along the first negative electrode end edge 38S of the negative electrode foil 38, and a band-shaped negative electrode foil exposed portion 30G that has the negative electrode foil 38 exposed along the second negative electrode end edge 38T of the negative electrode foil 38 (see FIG. 4).

The electrode body 10 that has the positive electrode plate 20, the negative electrode plate 30 and the separators 40 as described above has the positive electrode active material layer wound portion 14 that is obtained by winding the positive electrode active material layer forming portion 20F, and the negative electrode active material layer wound portion 19 that is obtained by winding the negative electrode active material layer forming portion 30F. Besides, the electrode body 10 has a positive electrode exposed wound portion 11 that is located on one side DX1 (the left side in FIG. 2) in an axial direction DX along the winding axis AX with respect to the positive electrode active material layer wound portion 14 and is obtained by winding the positive electrode foil exposed portion 20G, and a negative electrode exposed wound portion 16 that is located on the other side DX2 (the right side in FIG. 2) in the axial direction DX with respect to the negative electrode active material layer wound portion 19 and is obtained by winding the negative electrode foil exposed portion 30G.

Among these components, the positive electrode exposed wound portion 11 is constituted of two positive electrode R-shaped exposed wound portions, namely, a first positive electrode R-shaped exposed wound portion 12A and a second positive electrode R-shaped exposed wound portion 12B that are located at both end portions of the aforementioned oval cross-section PJ in a major axis direction DL respectively and are formed by bending back the positive electrode foil exposed portion 20G in the shape of R, and a positive electrode flat plate-like exposed wound portion 13 that is located between these positive electrode R-shaped exposed wound portions 12A and 12B and has the positive electrode foil exposed portion 20G spread in the shape of a flat plate.

Besides, this positive electrode exposed wound portion 11 has two slits S1 and S1 that assume the shape of a straight line extending in the axial direction DX (see FIG. 2). As shown in FIG. 2, these two slits S1 and S1 divide the positive electrode exposed wound portion 11 into three regions in the major axis direction DL. Thus, among these three regions, the region of the positive electrode exposed wound portion 11 that is located above in FIG. 2 and includes the first positive electrode R-shaped exposed wound portion 12A is defined as a first positive electrode exposed wound end portion 11X. Besides, the region of the positive electrode exposed wound portion 11 that is located below in FIG. 2 and includes the second positive electrode R-shaped exposed wound portion 12B is defined as a second positive electrode exposed wound end portion 11Y. Furthermore, the region of the positive electrode exposed wound portion 11 that is located in a central region in the major axis direction DL and is sandwiched between the first positive electrode exposed wound end portion 11X and the second positive electrode exposed wound end portion 11Y is defined as a positive electrode exposed wound central portion 11C. Incidentally, in this embodiment of the invention, the first positive electrode exposed wound end portion 11X is constituted of the first positive electrode R-shaped exposed wound portion 12A and part of the positive electrode flat plate-like exposed wound portion 13 that is adjacent to the first positive electrode R-shaped exposed wound portion 12A. Besides, the second positive electrode exposed wound end portion 11Y is constituted of the second positive electrode R-shaped exposed wound portion 12B and part of the positive electrode flat plate-like exposed wound portion 13 that is adjacent to the second positive electrode R-shaped exposed wound portion 12B.

Besides, this positive electrode exposed wound central portion 11C is detached from both the first positive electrode exposed wound end portion 11X and the second positive electrode exposed wound end portion 11Y by the two slits S1 and S1, while maintaining contact with the positive electrode active material layer wound portion 14 that is adjacent to the positive electrode exposed wound central portion 11C in the axial direction DX. Furthermore, the positive electrode joint portion 51 of the aforementioned positive electrode collector member 50 is deposited and joined to this positive electrode exposed wound central portion 11C. That is, through ultrasonic welding, the positive electrode joint portion 51 of the positive electrode collector member 50 is welded to this positive electrode exposed wound central portion 11C of the first positive electrode exposed wound end portion 11X.

Besides, the negative electrode exposed wound portion 16 is constituted of two negative electrode R-shaped exposed wound portions, namely, a first negative electrode R-shaped exposed wound portion 17A and a second negative electrode R-shaped exposed wound portion 17B that are located at both end portions in the aforementioned major axis direction DL respectively and are formed by bending back the negative electrode foil exposed portion 30G in the shape of R, and a negative electrode flat plate-like exposed wound portion 18 that is located between these negative electrode R-shaped exposed wound portions 17A and 17B and has the negative electrode foil exposed portion 30G spread in the shape of a flat plate.

Besides, this negative electrode exposed wound portion 16 has two slits S2 and S2 that assume the shape of a straight line extending in the axial direction DX (see FIG. 2). As shown in FIG. 2, as is the case with the positive electrode side, these two slits S2 and S2 divide the negative electrode exposed wound portion 16 into three regions in the major axis direction DL. Thus, among these three regions, the region of the negative electrode exposed wound portion 16 that is located above in FIG. 2 and includes the first negative electrode R-shaped exposed wound portion 17A is defined as a first negative electrode exposed wound end portion 16X. Besides, the region of the negative electrode exposed wound portion 16 that is located below in FIG. 2 and includes the second negative electrode R-shaped exposed wound portion 17B is defined as a second negative electrode exposed wound end portion 16Y. Furthermore, the region of the negative electrode exposed wound portion 16 that is located in the central region in the major axis direction DL and is sandwiched between the first negative electrode exposed wound end portion 16X and the second negative electrode exposed wound end portion 16Y is defined as a negative electrode exposed wound central portion 16C. Incidentally, in this embodiment of the invention, the first negative electrode exposed wound end portion 16X is constituted of the first negative electrode R-shaped exposed wound portion 17A and part of the negative electrode flat plate-like exposed wound portion 18 that is adjacent to the first negative electrode R-shaped exposed wound portion 17A. Besides, the second negative electrode exposed wound end portion 16Y is constituted of the second negative electrode R-shaped exposed wound portion 17B and part of the negative electrode flat plate-like exposed wound portion 18 that is adjacent to the second negative electrode R-shaped exposed wound portion 17B.

Besides, this negative electrode exposed wound central portion 16C is detached from both the first negative electrode exposed wound end portion 16X and the second negative electrode exposed wound end portion 16Y by the two slits S2 and S2, while maintaining contact with the negative electrode active material layer wound portion 19 that is adjacent to the negative electrode exposed wound central portion 16C in the axial direction DX. Furthermore, the negative electrode joint portion 61 of the foregoing negative electrode collector member 60 is deposited and joined to this negative electrode exposed wound central portion 16C. That is, through resistance welding, the negative electrode joint portion 61 of the negative electrode collector member 60 is welded to this negative electrode exposed wound central portion 16C of the first negative electrode exposed wound end portion 16X.

As described above, in the battery 1 according to this embodiment of the invention, the positive electrode exposed wound central portion 11C is detached from the two positive electrode exposed wound end portions (the first positive electrode exposed wound end portion 11X and the second positive electrode exposed wound end portion 11Y), and the positive electrode collector member 50 is joined to the positive electrode exposed wound central portion 11C. Thus, even though the positive electrode collector member 50 is joined to the positive electrode exposed wound central portion 11C, the first positive electrode exposed wound end portion 11X and the second positive electrode exposed wound end portion 11Y, which are detached from the positive electrode exposed wound central portion 11C, are restrained from being deformed. Consequently, in this first positive electrode exposed wound end portion 11X and this second positive electrode exposed wound end portion 11Y, a gap can be secured between the positive electrode foil exposed portions 20G that constitute these end portions. Accordingly, a gas produced between the active material layers (the positive electrode active material layer 21 and the negative electrode active material layer 31) can be easily discharged to the outside of the electrode body 10 through this first positive electrode exposed wound end portion 11X and this second positive electrode exposed wound end portion 11Y.

Besides, in this battery 1, as opposed to the aforementioned Patent Document 2, in addition to the positive electrode exposed wound central portion 11C, the first positive electrode exposed wound end portion 11X and the second positive electrode exposed wound end portion 11Y remain without being removed. Thus, during charge/discharge, the retained electrolytic solution 70 extruded from between the material layers can be temporarily retained between the positive electrode foil exposed portions 20G of the first positive electrode exposed wound end portion 11X and the second positive electrode exposed wound end portion 11Y. Consequently, the battery 1 that restrains the retained electrolytic solution 70 extruded from the electrode body 10 through charge/discharge from directly flowing out to the outside of the electrode body 10 can be realized.

Besides, the same holds true for the negative electrode side. That is, the negative electrode exposed wound central portion 16C is detached from the two negative electrode exposed wound end portions (the first negative electrode exposed wound end portion 16X and the second negative electrode exposed wound end portion 16Y), and the negative electrode collector member 60 is joined to the negative electrode exposed wound central portion 16C. Thus, even though the negative electrode collector member 60 is joined to the negative electrode exposed wound central portion 16C, the first negative electrode exposed wound end portion 16X and the second negative electrode exposed wound end portion 16Y, which are detached from the negative electrode exposed wound central portion 16C, axe restrained from being deformed. Consequently, in this first negative electrode exposed wound end portion 16X and this second negative electrode exposed wound end portion 16Y, a gap can be secured between the negative electrode foil exposed portions 300 that constitute these end portions. Accordingly, a gas produced between the active material layers (the positive electrode active material layer 21 and the negative electrode active material layer 31) can be easily discharged to the outside of the electrode body 10 through this first negative electrode exposed wound end portion 16X and this second negative electrode exposed wound end portion 16Y.

Besides, as opposed to the foregoing Patent Document 2, in addition to the negative electrode exposed wound central portion 16C, this battery 1 has the first negative electrode exposed wound end portion 16X and the second negative electrode exposed wound end portion 16Y. Therefore, during charge/discharge, as is the case with the positive electrode side, the retained electrolytic solution 70 extruded from between the material layers can be temporarily retained between the negative electrode foil exposed portions 30G of the first negative electrode exposed wound end portion 16X and the second negative electrode exposed wound end portion 16Y Consequently, the battery 1 that restrains the retained electrolytic solution 70 extruded from the electrode body 10 through charge/discharge from directly flowing out to the outside of the electrode body 10 can be realized.

Besides, in the battery 1, the positive electrode exposed wound central portion 11C is detached from both the positive electrode exposed wound end portions (the first positive electrode exposed wound end portion 11X and the second positive electrode exposed wound end portion 11Y). Thus, both the first positive electrode exposed wound end portion 11X and the second positive electrode exposed wound end portion 11Y can be prevented from being deformed due to the joining of the positive electrode collector member 50 and the positive electrode exposed wound central portion 11C with each other, and a gap can be secured between the positive electrode foil exposed portions 20G that constitute the first positive electrode exposed wound end portion 11X and the second positive electrode exposed wound end portion 11Y. Accordingly, the battery 1 that reliably allows the gas produced between the active material layers to be discharged to the outside of the electrode body 10 from between the active material layers can be realized.

Besides, the same holds true for the negative electrode side. The negative electrode exposed wound central portion 16C is detached from both the negative electrode exposed wound end portions (the first negative electrode exposed wound end portion 16X and the second negative electrode exposed wound end portion 16Y). Thus, both the first negative electrode exposed wound end portion 16X and the second negative electrode exposed wound end portion 16Y can be prevented from being deformed due to the joining of the negative electrode collector member 60 and the negative electrode exposed wound central portion 16C with each other, and a gap can be secured between the negative electrode foil exposed portions 30G that constitute the first negative electrode exposed wound end portion 16X and the second negative electrode exposed wound end portion 16Y. Accordingly, the battery 1 that reliably allows the gas produced between the active material layers to be discharged to the outside of the electrode body 10 from between the active material layers can be realized.

Next, a method of manufacturing the battery 1 according to this embodiment of the invention will be described with reference to the drawings. First of all, the positive electrode plate 20 that constitutes the electrode body 10 is fabricated according to a known method. Consequently, the positive electrode plate 20 that has the band-shaped positive electrode active material layer forming portion 20F along the first positive electrode end edge 28S of the positive electrode foil 28, and the band-shaped positive electrode foil exposed portions 20G along the second positive electrode end edge 28T of the positive electrode foil 28 was fabricated (see FIG. 4).

Besides, the negative electrode plate 30 is also fabricated according to the known method. Consequently, the negative electrode plate 30 that has the band-shaped negative electrode active material layer forming portion 30F along the first negative electrode end edge 38S of the negative electrode foil 38, and the band-shaped negative electrode foil exposed portions 300 along the second negative electrode end edge 38T of the negative electrode foil 38 was fabricated (see FIG. 4).

Figure 5A:
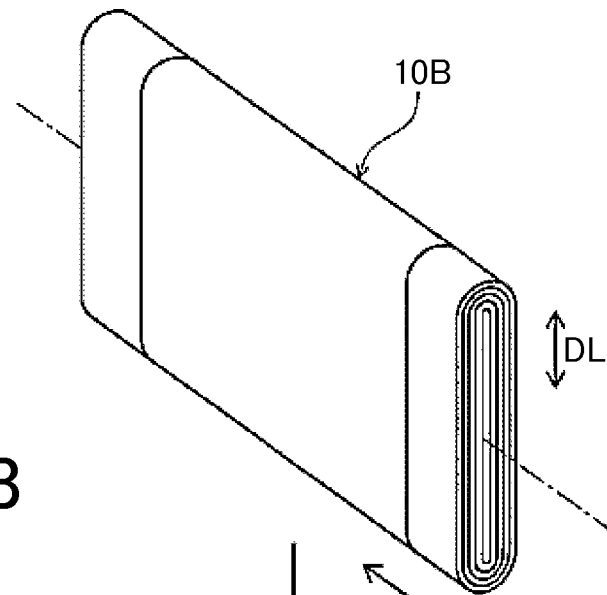
FIG. 5 is an illustrative view of a method of manufacturing the battery according to the embodiment of the invention and the second modified embodiment of the invention.

Subsequently, the fabricated positive electrode plate 20 and the fabricated negative electrode plate 30 were cylindrically wound together with the foregoing two band-shaped separators 40 and 40. At this time, the positive electrode plate 20 and the negative electrode plate 30 are wound such that the positive electrode foil exposed portion 20G of the positive electrode plate 20 and the negative electrode foil exposed portion 300 of the negative electrode plate 30 are located on the other side of each other in the axial direction DX. After that, the cylindrical face was crushed from both sides to obtain a flat wound-type slit pre-formation electrode body 10B that has a flat oval cross-section (see FIG. 5(a)).

Next, a slit formation process of forming the two slits S1 and S1 through the positive electrode exposed wound portion 11 and forming the two slits S2 and S2 through the negative electrode exposed wound portion 16 will be described. In this process, a known slitter (a cutting machine) is used to form the two slits S1 and S1, which detach the positive electrode exposed wound portion 11 into the positive electrode exposed wound central portion 11C, the first positive electrode exposed wound end portion 11X and the second positive electrode exposed wound end portion 11Y as described above, through the positive electrode exposed wound portion 11 in the aforementioned slit pre-formation electrode body 10B. Besides, the two slits S2 and S2, which detach the negative electrode exposed wound portion 16 into the negative electrode exposed wound central portion 16C, the first negative electrode exposed wound end portion 16X and the second negative electrode exposed wound end portion 16Y as described above, are formed through the negative electrode exposed wound portion 16 in the slit pre-formation electrode body 10B. Incidentally, both the slits S1 and S2 are designed to rectilinearly extend along the axial direction DX.

Figure 5B:
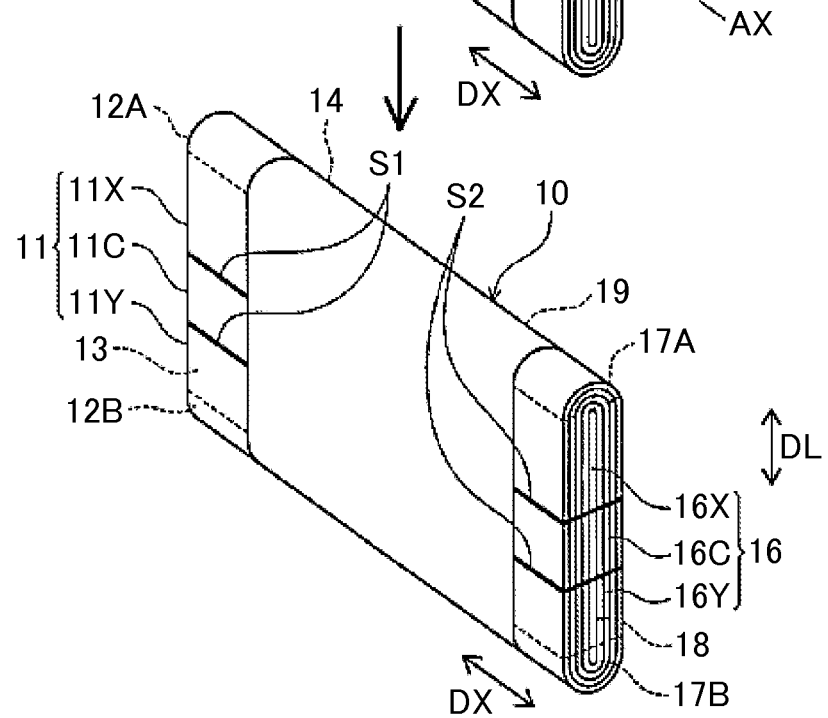

Consequently, the electrode body 10 that is detached from all of the positive electrode exposed wound central portion 11C, the first positive electrode exposed wound end portion 11X and the second positive electrode exposed wound end portion 11Y of the positive electrode exposed wound portion 11 and is detached from all of the negative electrode exposed wound central portion 16C, the first negative electrode exposed wound end portion 16X and the second negative electrode exposed wound end portion 16Y of the negative electrode exposed wound portion 16 is completed (see FIG. 5(b)).

Next, a joint process will be described. First of all, the positive electrode terminal portion 52 (the body portion 53) of the positive electrode collector member 50 is passed through the first through-hole 82X, and the negative electrode terminal portion 62 (the body portion 63) of the negative electrode collector member 60 is passed through the second through-hole 82Y. Thus, the sealing lid 82 that is integrally molded by the insulating members 95 in advance is prepared.

Then, the positive electrode exposed wound central portion 11C of the aforementioned electrode body 10 (i.e., the electrode body 10 that is detached from all of the positive electrode exposed wound central portion 11C, the first positive electrode exposed wound end portion 11X, and the second positive electrode exposed wound end portion 11Y of the positive electrode exposed wound portion 11) is sandwiched between the positive electrode joint portion 51 of the positive electrode collector member 50 and a welding block (not shown) to crush the positive electrode exposed wound central portion 11C (the respective regions of the positive electrode foil exposed portions 20G that constitute this positive electrode exposed wound central portion) in the minor axis direction DS.

Subsequently, the positive electrode collector member 50 and the positive electrode exposed wound central portion 11C are ultrasonically welded to each other. Specifically, the positive electrode joint portion 51 of the positive electrode collector member 50 and the positive electrode exposed wound central portion 11C are ultrasonically welded to each other through the use of a known ultrasonic welder. Thus, the positive electrode collector member 50 and the electrode body 10 are joined to each other.

Besides, the same process as on the positive electrode side is carried out on the negative electrode side. However, the difference consists in that the negative electrode collector member 60 and the negative electrode exposed wound central portion 16C are resistance-welded to each other through the use of a known resistance welder. Consequently, as is the case with the positive electrode side, the negative electrode collector member 60 and the electrode body 10 are joined to each other.

After that, the electrode body 10 is accommodated in the battery case body 81. The battery case body 81 is sealed through welding by the sealing lid 82 that is penetrated by the positive electrode collector member 50 and the negative electrode collector member 60, which are joined to this electrode body 10. Furthermore, the electrolytic solution is injected from a liquid injection hole (not shown), the liquid injection hole is sealed while reducing the pressure in the battery case 80 to −80 kPa, and then initial charge is carried out to complete the battery 1 (see FIGS. 1 to 3).

Incidentally, in the aforementioned initial charge, the battery 1 was charged with a current value of 1 C until the voltage (the inter-terminal voltage) of the battery 1 became equal to 4.1 V under a temperature environment of 25° C., and then was charged until the current value became equal to 0.02 C while this voltage was held (constant current-constant voltage charge). The charge time in this case was 85 minutes.

Besides, the inventors carried out similar initial charge in manufacturing a battery (hereinafter referred to also as a comparative battery) that does not have slits through a positive electrode wound portion of an electrode body or a negative electrode exposed wound portion of the electrode body as opposed to the battery 1 according to this embodiment of the invention. It is apparent that the charge time in this case is 88 minutes, and that the charge time of the battery 1 according to this embodiment of the invention is shorter.

This is considered to result from the fact that if a gas produced between the active material layers through initial charge remains stagnant between the active material layers, part of the electrolytic solution cannot exist between the positive electrode active material layer and the negative electrode active material layer, and hence the progress of a charge reaction is delayed in comparison with a battery between which and an active material layer no gas stagnates. Besides, the comparative battery does not have slits through an exposed wound portion, and hence the gap between regions of a foil exposed portion that are adjacent to each other in a radial direction is narrow at a joint spot of a collector member and the exposed wound portion, and the gap narrows as the distance to this joint spot decreases. On the other hand, in the battery 1 subjected to the foregoing joint process, as shown in FIG. 6(b), the gap between the foil exposed portions at the exposed wound central portion is narrow, but the gap between the foil exposed portions at the exposed wound end portions is secured. That is, it is considered that the battery 1 according to this embodiment of the invention is designed to be more likely to discharge the gas produced between the active material layers through initial charge to the outside of the electrode body through the exposed wound portion (the exposed wound end portions), than the comparative battery.

The method of manufacturing the battery 1 according to this embodiment of the invention is equipped with a joint process of joining the positive electrode collector member 50 to the positive electrode exposed wound central portion 11C of the electrode body 10 that has already been detached from the first positive electrode exposed wound end portion 11X and the second positive electrode exposed wound end portion 11Y as parts of the positive electrode exposed wound portion 11. Thus, by joining the positive electrode collector member 50 to the positive electrode exposed wound central portion 11C, a stress is unlikely to be applied to the first positive electrode exposed wound end portion 11X and the second positive electrode exposed wound end portion 11Y that are detached from this positive electrode exposed wound central portion 11C even when this positive electrode exposed wound central portion 11C is deformed. Accordingly, the battery 1 can be manufactured with the gap between the positive electrode foil exposed portions 20O, which constitute the first positive electrode exposed wound end portion 11X and the second positive electrode exposed wound end portion 11Y, restrained from narrowing.

Besides, as for the negative electrode side as well, as is the case with the positive electrode side, a joint process of joining the negative electrode collector member 60 to the negative electrode exposed wound central portion 16C of the electrode body 10 that has already been detached from the first negative electrode exposed wound end portion 16X and the second negative electrode exposed wound end portion 16Y as parts of the negative electrode exposed wound portion 16 is provided.

Thus, by joining the negative electrode collector member 60 to the negative electrode exposed wound central portion 16C, a stress is unlikely to be applied to the first negative electrode exposed wound end portion 16X and the second negative electrode exposed wound end portion 16Y that are detached from this negative electrode exposed wound central portion 16C even when this negative electrode exposed wound central portion 16C is deformed. Accordingly, the battery 1 can be manufactured with the gap between the negative electrode foil exposed portions 30G, which constitute the first negative electrode exposed wound end portion 16X and the second negative electrode exposed wound end portion 16Y, restrained from narrowing.

First Modified Embodiment

Next, the first modified embodiment of the invention will be described with reference to the drawings. This first modified embodiment of the invention is different from the aforementioned embodiment of the invention in that a flat wound electrode body is completed after slits are formed through an exposed wound portion of a cylindrical electrode body. Thus, the difference from the embodiment of the invention will be mainly described, and the description of similar parts will be omitted or simplified. Incidentally, a similar operation and a similar effect are created as to the similar parts. Besides, the description will be given with like reference numerals allocated to like contents respectively.

A method of manufacturing the battery 1 according to this first modified embodiment of the invention will be described with reference to the drawings. First of all, the positive electrode plate 20 and the negative electrode plate 30, which have been fabricated according to a known method, were cylindrically wound around the winding axis AX together with the two band-shaped separators 40 and 40. At this time, as is the case with the embodiment of the invention, the positive electrode plate 20 and the negative electrode plate 30 are wound such that the positive electrode foil exposed portions 20G of the positive electrode plate 20 and the negative electrode foil exposed portions 30G of the negative electrode plate 30 are located on the other side of each other respectively in the axial direction DX. Consequently, a cylindrical wound-type slit pre-formation electrode body 107 is completed (see FIG. 7(*a*)).

Next, a process of forming the slits S1 (S2) through the positive electrode exposed wound portion 11 (the negative electrode exposed wound portion 16) will be described. Incidentally, this first modified embodiment of the invention is different from the embodiment of the invention in which the slits S1 and S2 are formed through the flat wound-type slit pre-formation electrode body 10B, in that the slits S1 and S2 are formed through the cylindrical wound-type slit pre-formation electrode body 10J.

Figure 7A:
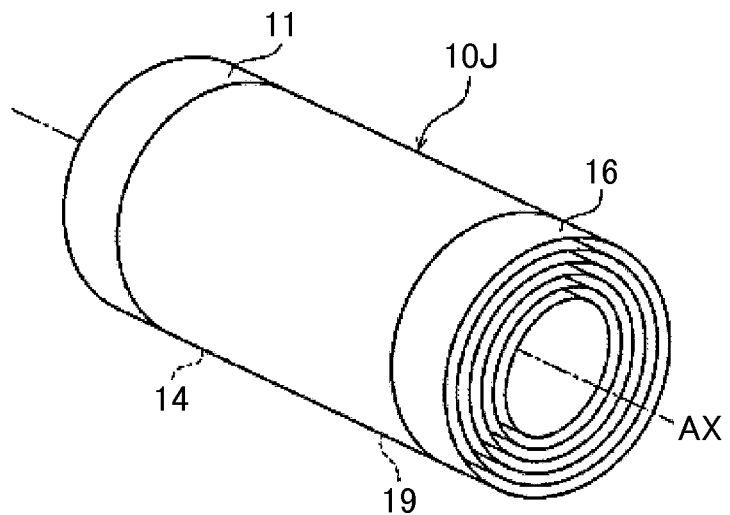
FIG. 7 is an illustrative view of the method of manufacturing the battery according to the first modified embodiment of the invention.
Figure 7B:
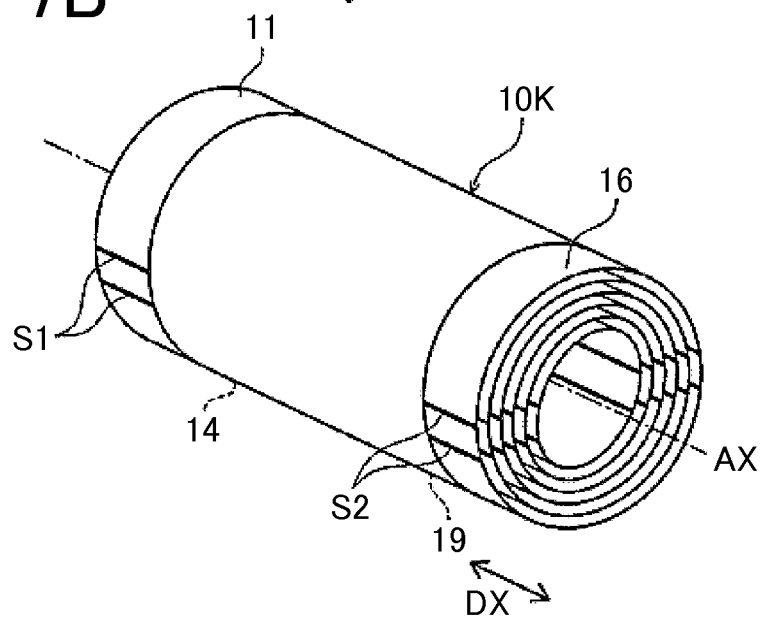

That is, in this process, the two slits S1 and S1 that rectilinearly extend along the axial direction DX were formed through the positive electrode exposed wound portion 11 of the cylindrical wound-type slit pre-formation electrode body 10J, through the use of a known slitter (a cutting machine) (see FIG. 7(*b*)). Specifically, the two slits S1 and S1 that rectilinearly extend along the axial direction DX were formed through the positive electrode exposed wound portion 11 in such a manner as to sandwich the winding axis AX between the two slits S1 and S1 to be formed, through the use of the slitter.

Besides, as for the negative electrode side as well, by the same token, the two slits S2 and S2 that rectilinearly extend along the axial direction DX were formed through the negative electrode exposed wound portion 16 of the cylindrical wound-type slit pre-formation electrode body 10J (see FIG. 7(*b*)). Consequently, a cylindrical wound-type electrode body 10K that has the two slits S1 and S1 and the two slits S2 and S2 is completed.

Next, a cylindrical face of the cylindrical wound-type electrode body 10K is crushed to be deformed into a flat wound type. Thus, the electrode body 10 similar to that of the foregoing embodiment of the invention is completed (see FIG. 5(*b*)).

Incidentally, after the deformation process, the battery 1 is manufactured similarly to the foregoing embodiment of the invention. Therefore, the description will be omitted.

Second Modified Embodiment

Next, the second modified embodiment of the invention will be described with reference to the drawings. As is the case with the embodiment of the invention, a battery 101 according to this second modified embodiment of the invention has two slits that split an exposed wound portion into two exposed wound end portions and an exposed wound central portion. However, the battery 101 is different from the battery 1 according to the aforementioned embodiment of the invention in that the exposed wound central portion is made longer in the major axis direction DL than in the embodiment of the invention and is constituted of a region of the exposed wound portion other than the two R-shaped exposed wound portions.

That is, as shown in FIG. 8, a positive electrode exposed wound portion 111 in the electrode body 110 according to this second modified embodiment of the invention is constituted of the first positive electrode R-shaped exposed wound portion 12A, the second positive electrode R-shaped exposed wound portion 12B and the positive electrode flat plate-like exposed wound portion 13 as is the case with the foregoing embodiment of the invention.

However, in this second modified embodiment of the invention, a first positive electrode exposed wound end portion 111X is constituted of the first positive electrode R-shaped exposed wound portion 12A, a second positive electrode exposed wound end portion 111Y is constituted of the second positive electrode R-shaped exposed wound portion 12B, and a positive electrode exposed wound central portion 111C is constituted of the positive electrode flat plate-like exposed wound portion 13 as a region of the positive electrode exposed wound portion 111 other than the two positive electrode R-shaped exposed wound portions 12A and 12B.

Besides, as shown in FIG. 8, a negative electrode exposed wound portion 116 is constituted of the first negative electrode R-shaped exposed wound portion 17A, the second negative electrode R-shaped exposed wound portion 17B and the negative electrode flat plate-like exposed wound portion 18 as is the case with the foregoing embodiment of the invention.

However, in this second modified embodiment of the invention, a first negative electrode exposed wound end portion 116X is constituted of the first negative electrode R-shaped exposed wound portion 17A, a second negative electrode exposed wound end portion 116Y is constituted of the second negative electrode R-shaped exposed wound portion 17B, and a negative electrode exposed wound central portion 116C is constituted of the negative electrode flat plate-like exposed wound portion 18 as a region of the negative electrode exposed wound portion 116 other than the two negative electrode R-shaped exposed wound portions 17A and 17B.

In addition to the exertion of a similar operation and a similar effect due to a configuration similar to that of the embodiment of the invention, in the battery 101 according to this second modified embodiment of the invention, the positive electrode flat plate-like exposed wound portion 13 as the region of the positive electrode exposed wound portion 111 other than the positive electrode R-shaped exposed wound portions 12A and 12B is defined as the positive electrode exposed wound central portion 111C. That is, the positive electrode exposed wound central portion 111C is secured with a longest dimension in the major axis direction DL. Thus, the battery 101 in which the positive electrode exposed wound central portion 111C and the positive electrode active material layer wound portion 14 are connected to each other with a lowest resistance can be realized.

Besides, the same holds true for the negative electrode side as well. That is, the negative electrode flat plate-like exposed wound portion 18 as the region of the negative electrode exposed wound portion 116 other than the negative electrode R-shaped exposed wound portions 17A and 17B is defined as the negative electrode exposed wound central portion 116C. That is, the negative electrode exposed wound central portion 116C is secured with a longest dimension in the major axis direction DL. Thus, the battery 101 in which the negative electrode exposed wound central portion 116C and the negative electrode active material layer wound portion 19 are connected to each other with a lowest resistance can be realized.

The invention has been described hereinabove referring to the embodiment thereof, the first modified embodiment thereof, and the second modified embodiment thereof. However, the invention is not limited to the aforementioned embodiment thereof or the like. It goes without saying that the invention is applicable after being appropriately altered without departing from the gist thereof.

Figure 9:
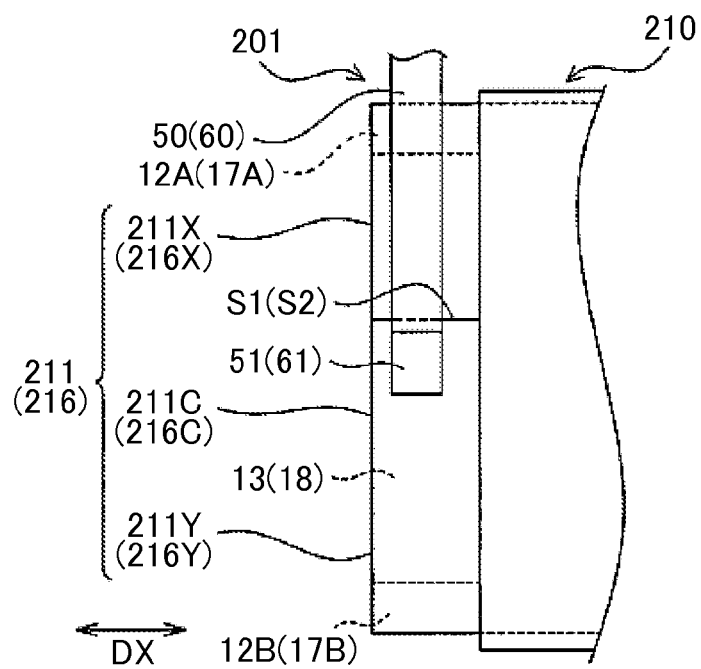
FIG. 9 is an illustrative view showing another embodiment of the battery.
Figure 10:
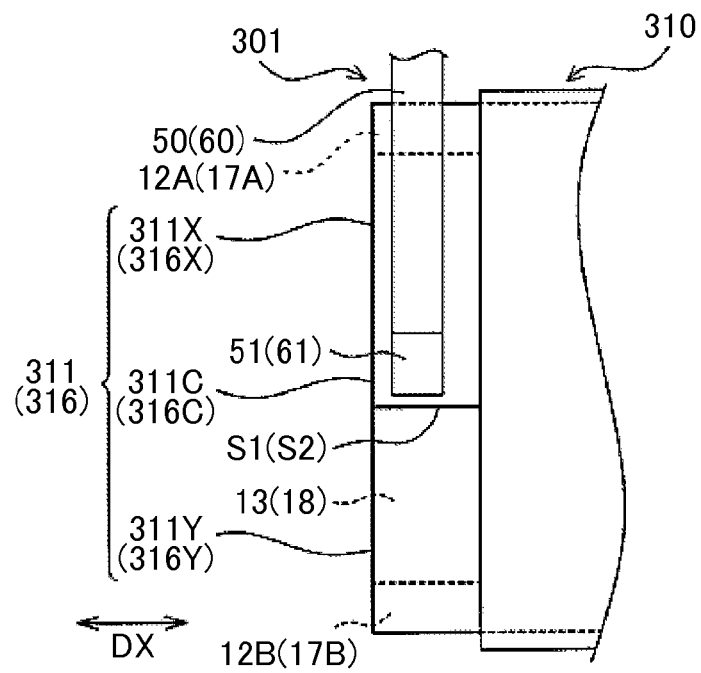
FIG. 10 is an illustrative view showing still another embodiment of the battery.

For example, the embodiment of the invention and the like present the mode in which the positive electrode exposed wound central portion 11C (111C) is detached from both the positive electrode exposed wound end portions 11X and 11Y (111X and 111Y) by the two slits S1 and S1 (e.g., see FIGS. 2 and 8). However, it is also acceptable to realize a battery 201 (301) that is equipped with an electrode body 210 (310) in which a positive electrode exposed wound central portion 211C (311C) is detached from one of two positive electrode exposed wound end portions 211X and 211Y (311X and 311Y) by the single slit S1 (see FIGS. 9 and 10). Besides, as for the negative electrode side, it is also acceptable to realize the battery 201 (301) that is equipped with the electrode body 210 (310) in which a negative electrode exposed wound central portion 216C (316C) is detached from one of two negative electrode exposed wound end portions 216X and 216Y (316X and 316Y) by the single slit S2 (see FIGS. 9 and 10).

Besides, the embodiment of the invention and the like present the example in which the rectilinearly extending slits S1 and S2 are formed as the mode in which the exposed wound central portion 11C (16C, 111C, 116C) and each of the exposed wound end portions 11X (11Y, 16X, 16Y, 111X, 111Y, 116X, 116Y) is detached from each other (e.g., see FIGS. 2 and 8). However, the exposed wound central portion and each of the exposed wound end portions can also be detached from each other by other types of slits, for example, slits that extend in the shape of waves such as rectangular waves, sinusoidal waves or the like.

Figure 11:
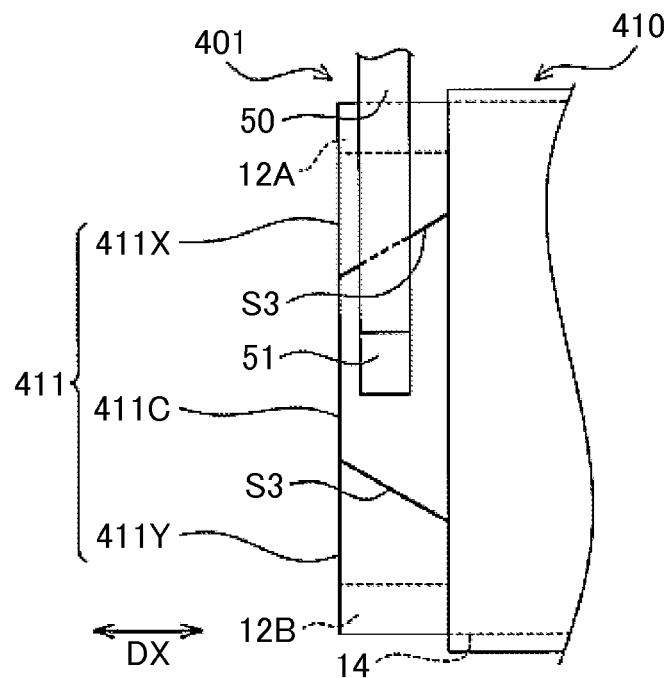
FIG. 11 is an illustrative view showing still another embodiment of the battery.
Figure 12:
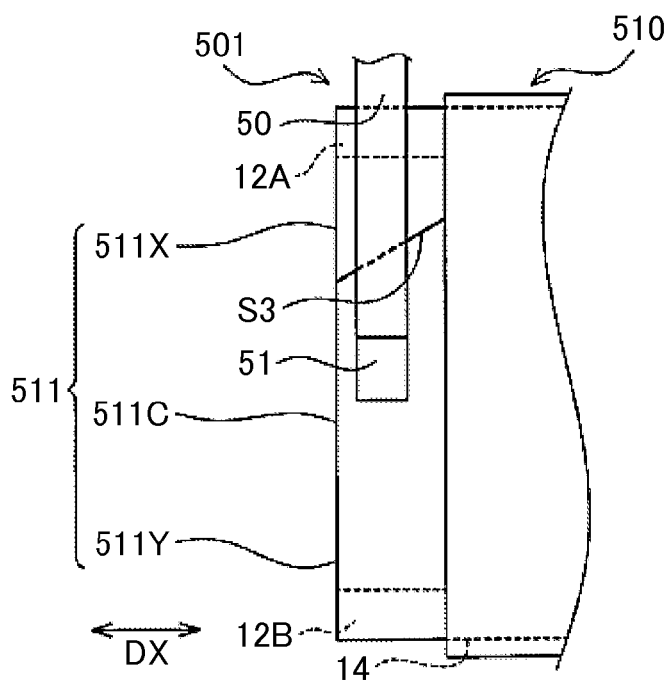
FIG. 12 is an illustrative view showing still another embodiment of the battery.

Besides, the embodiment of the invention and the like exemplify the slits S1 and S2 that extend parallel to each other along the axial direction DX. However, for example, as shown in FIGS. 11 and 12, it is also acceptable to realize a battery 401 (501) that is equipped with an electrode body 410 (510) that is detached by slits S3 designed to gradually approach positive electrode exposed wound end portions 411X and 411Y (511X and 511Y) from a positive electrode exposed wound central portion 411C (511C) in accordance with the traveling from a positive electrode exposed wound portion 411 (511) side toward the positive electrode active material layer wound portion 14 side (rightward in the drawings) in the axial direction DX. Besides, the same holds true for the negative electrode side.

Figure 13:
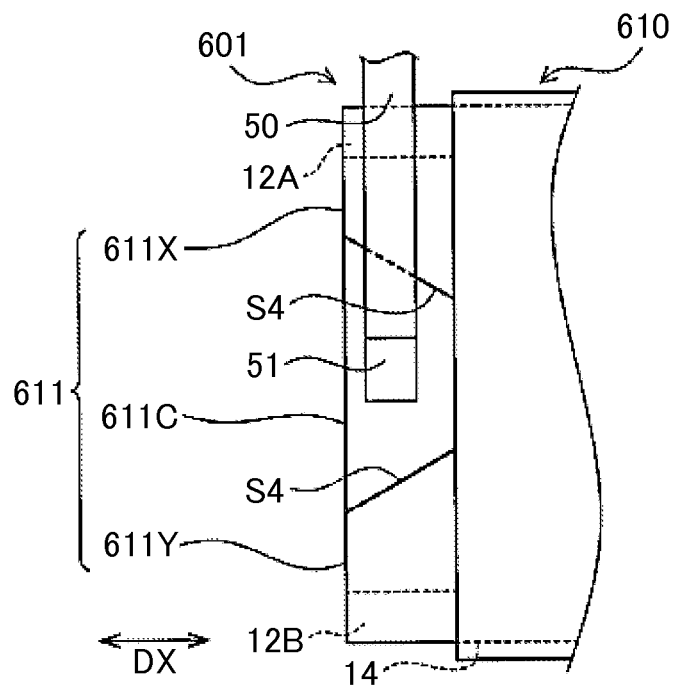
FIG. 13 is an illustrative view showing still another embodiment of the battery.
Figure 14:
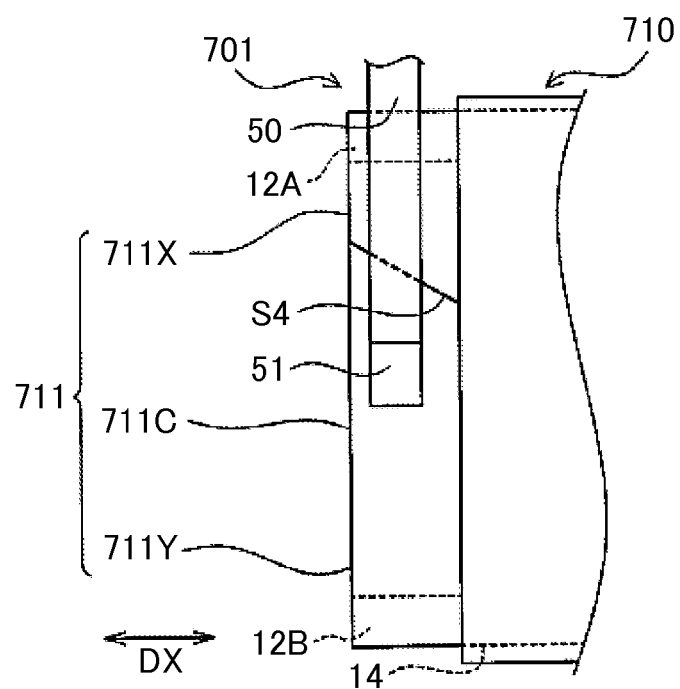
FIG. 14 is an illustrative view showing still another embodiment of the battery.

On the contrary, for example, as shown in FIGS. 13 and 14, it is also acceptable to realize a battery 601 (701) that is equipped with an electrode body 610 (710) that is detached by slits S5 designed to gradually move away from positive electrode exposed wound end portions 611X and 611Y (711X and 711Y) and gradually approach a positive electrode exposed wound central portion 611C (711C), in accordance with the traveling from a positive electrode exposed wound portion 611 (711) side toward the positive electrode active material layer wound portion 14 side (rightward in the drawings) in the axial direction DX. Besides, the same holds true for the negative electrode side.

The invention claimed is:

1. A battery comprising:
   a flat wound electrode body that is obtained by winding an electrode plate around a winding axis, the electrode plate including a band-shaped active material layer forming portion that is obtained by forming an active material layer on a band-shaped metal foil along a first end edge as one of two end edges extending in a longitudinal direction of the metal foil, and a band-shaped foil exposed portion that has the metal foil exposed along a second end edge as the other of the two end edges of the metal foil, that has a flat oval cross-section, and that has an active material layer wound portion that is obtained by winding the active material layer forming portion, and an exposed wound portion that is located on one side in an axial direction along the winding axis with respect to the active material layer wound portion and has the foil exposed portion that is wound;
   a collector member that is made of a metal, and is joined to the exposed wound portion of the flat wound electrode body; and
   a retained electrolytic solution that is retained by the active material layer wound portion of the flat wound electrode body, wherein
   when regions of the exposed wound portion that are located at both end portions of the oval cross-section in a major axis direction respectively and are obtained by bending back the foil exposed portion into a shape of R are defined as R-shaped exposed wound portions, regions of the exposed wound portion that include the R-shaped exposed wound portions are defined as exposed wound end portions, and a region of the exposed wound portion that is located in a central region in the major axis direction and is sandwiched between the exposed wound end portions is defined as an exposed wound central portion,
   the exposed wound central portion is detached from at least one of the two exposed wound end portions, while maintaining contact with the active material layer wound portion that is adjacent to the exposed wound central portion in the axial direction, and
   the collector member is joined to the exposed wound central portion.

2. The battery according to claim 1, wherein
   the exposed wound central portion is detached from both the exposed wound end portions.

3. The battery according to claim 1, wherein
the exposed wound central portion is constituted by a region of the exposed wound portion other than the two R-shaped exposed wound portions.

4. A method of manufacturing a battery that is equipped with:
- a flat wound electrode body that is obtained by winding an electrode plate around a winding axis, the electrode plate including a band-shaped active material layer forming portion that is obtained by forming an active material layer on a band-shaped metal foil along a first end edge as one of two end edges extending in a longitudinal direction of the metal foil, and a band-shaped foil exposed portion that has the metal foil exposed along a second end edge as the other of the two end edges of the metal foil, that has a flat oval cross-section, and that has an active material layer wound portion that is obtained by winding the active material layer forming portion, and an exposed wound portion that is located on one side in an axial direction along the winding axis with respect to the active material layer wound portion and has the foil exposed portion that is wound;
- a collector member that is made of a metal, and is joined to the exposed wound portion of the flat wound electrode body; and
- a retained electrolytic solution that is retained by the active material layer wound portion of the flat wound electrode body, wherein when regions of the exposed wound portion that are located at both end portions of the oval cross-section in a major axis direction respectively and are obtained by bending back the foil exposed portion into a shape of R are defined as R-shaped exposed wound portions, regions of the exposed wound portion that include the R-shaped exposed wound portions are defined as exposed wound end portions, and a region of the exposed wound portion that is located in a central region in the major axis direction and is sandwiched between the exposed wound end portions is defined as an exposed wound central portion, the exposed wound central portion is detached from at least one of the two exposed wound end portions, while maintaining contact with the active material layer wound portion that is adjacent to the exposed wound central portion in the axial direction, and the collector member is joined to the exposed wound central portion, the method comprising:

joining the collector member to the exposed wound central portion as to the flat wound electrode body in which the exposed wound central portion of the exposed wound portion and at least one of the two exposed wound end portions of the exposed wound portion are detached from each other.

* * * * *